(12) United States Patent
Salter, Jr.

(10) Patent No.: US 9,863,309 B2
(45) Date of Patent: Jan. 9, 2018

(54) METHOD AND SYSTEM FOR USING THE BY-PRODUCT OF ELECTROLYSIS

(71) Applicant: Aaron Salter, Jr., Lockport, NY (US)

(72) Inventor: Aaron Salter, Jr., Lockport, NY (US)

( * ) Notice: Subject to any disclaimer, the term of this patent is extended or adjusted under 35 U.S.C. 154(b) by 97 days.

(21) Appl. No.: 14/807,569

(22) Filed: Jul. 23, 2015

(65) Prior Publication Data

US 2016/0025000 A1    Jan. 28, 2016

Related U.S. Application Data

(60) Provisional application No. 62/028,075, filed on Jul. 23, 2014.

(51) Int. Cl.
| | |
|---|---|
| F02B 43/10 | (2006.01) |
| C25B 1/04 | (2006.01) |
| C25B 9/06 | (2006.01) |
| F02B 43/12 | (2006.01) |
| F02M 21/02 | (2006.01) |
| F02M 25/10 | (2006.01) |

(52) U.S. Cl.
CPC .............. *F02B 43/10* (2013.01); *C25B 1/04* (2013.01); *C25B 9/06* (2013.01); *F02B 43/12* (2013.01); *F02M 21/0248* (2013.01); *F02B 2043/106* (2013.01); *F02M 25/10* (2013.01); *Y02E 60/366* (2013.01); *Y02T 10/32* (2013.01)

(58) Field of Classification Search
CPC .... F02B 2043/106; F02B 43/10; F02M 25/10
USPC .......................................................... 123/3
See application file for complete search history.

(56) References Cited

U.S. PATENT DOCUMENTS

| | | | |
|---|---|---|---|
| 4,271,793 A | 6/1981 | Valdespino | |
| 4,442,801 A * | 4/1984 | Glynn | C25B 9/06 123/3 |
| 5,513,600 A | 5/1996 | Teves | |
| 6,834,623 B2 | 12/2004 | Cheng | |
| 7,143,722 B2 | 12/2006 | Ross | |
| 2002/0153263 A1* | 10/2002 | Velev | C25B 1/04 205/628 |
| 2007/0284260 A1* | 12/2007 | Davidson | C25B 1/04 205/464 |

(Continued)

FOREIGN PATENT DOCUMENTS

EP    0105225 A2 *  4/1984  ......... B01D 21/0012

*Primary Examiner* — Jacob Amick
*Assistant Examiner* — Charles Brauch
(74) *Attorney, Agent, or Firm* — Vincent G. LoTempio; Kloss, Stenger and LoTempio; David T. Stephenson (57) ABSTRACT

An engine system for generating hydrogen and oxygen, and a method using a by-product of electrolysis, for use in an internal combustion engine to improve efficiency and reduce emissions. The engine system has an electrolysis cell for generating hydrogen and oxygen by electrolysis of an aqueous solution, a battery as a source of power for providing electrical power to the electrolysis cell, and cooling system for maintaining the temperature of the electrolysis cell to reduce problems associated with overheating of the cell during electrolysis. The engine system traps sludge generated during hydrolysis in a filter. The sludge is released from the filter by agitation, resulting in a gas containing the sludge which is then used during combustion to improve fuel efficiency. The novel reconfiguration of existing engine parts and introduction of new features results in a less expensive, cleaner and more efficient hydrogen powered engine.

19 Claims, 5 Drawing Sheets

(56) References Cited

U.S. PATENT DOCUMENTS

2009/0035658 A1* 2/2009 Harada ................ H01M 2/206
                                                              429/211
2009/0237038 A1* 9/2009 Heidebrink ............ H02K 16/00
                                                              322/28

* cited by examiner

METHOD AND SYSTEM FOR USING THE BY-PRODUCT OF ELECTROLYSIS

This application claims the benefit of U.S. Provisional Application No. 62/028,075, filed on Jul. 23, 2014. The present disclosure relates to internal combustion engines and especially to improvements in internal combustion engines having electrolytic cells for generating hydrogen and oxygen for combination with the fuel-air mixture for the engine.

BACKGROUND

Hydrogen is an excellent source of alternative energy for internal combustion engines. It is a highly efficient fuel with high energy release per pound, and it burns cleanly. Moreover, hydrogen can supplement gasoline in a conventional automobile engine without significant alteration to standard engine parts.

The use of hydrogen as a fuel supplement for internal combustion engines has been of ongoing interest in the automobile industry. The use of electrolysis of water as a means of providing hydrogen to automobile engines, however, has been attempted with limited success. A practical, efficient and inexpensive means of using water in an automobile engine has not yet been successfully integrated into the industry. Related systems utilizing hydrolysis generally have closed systems that doesn't allow for flow of the electrolyte solution or cleaning of the electrolyte solution to remove accumulated sludge.

One of the hurdles to overcome in the use of water as source of hydrogen in automobile engines is the low and inconstant yield of hydrogen. Further, electrolysis generally produces contaminants that coat the electrodes and the electrolysis tank and foul the water, leading to lower yields and equipment problems. Another issue to overcome has been the heat generated during electrolysis resulting in boiling of the water, thereby decreasing the efficiency of electrolysis. Any significant improvement in the use of hydrolysis in automobile engines would be of great value to the transportation industry.

SUMMARY OF THE INVENTION

The present disclosure overcomes problems associated with existing electrolysis systems in automobile engines and improves upon existing systems.

A fuel system is provided for generating hydrogen and oxygen for use in an internal combustion engine to improve combustion efficiency of the engine and to decrease emissions from the engine. An illustrative embodiment of the fuel system has at least one electrolysis cell for generating hydrogen and oxygen through electrolysis of an aqueous solution, a power source for providing electrical power to the electrolysis cell, and a cooling system for maintaining the temperature of the electrolysis cell in a workable range. A key feature of the present disclosure is the utilization of sludge generated by electrolysis to improve fuel efficiency in engines. The present disclosure has a longer line between the engine and the cooler than related systems. It is estimated that the method of utilization of the sludge generated during electrolysis as a fuel increases the efficiency of energy production of electrolysis by approximately 60%.

DETAILED DESCRIPTION OF THE INVENTION

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112. As used in the following description, the terms "horizontal", "vertical", "left", "right", "up", "down", as well as adjectival and adverbial derivatives thereof (e.g., "horizontally", "vertically", "upwardly", etc.) simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
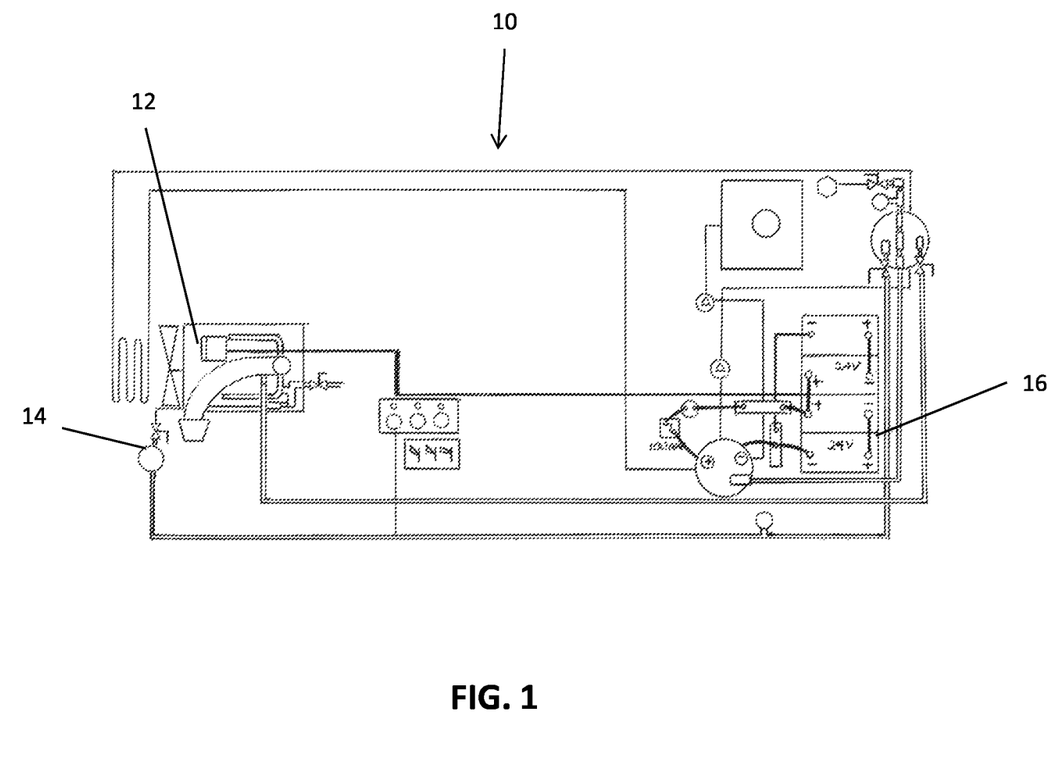
FIG. 1 is a schematic overview of the system of the present disclosure.

FIG. 1 shows engine system 10 of the present disclosure, which shows a novel configuration of elements including an electrolytic cell, or Joe cell 106, to improve fuel efficiency primarily for use in vehicles. In the preferred embodiment, designed for use with automobiles, the engine system 10 utilizes gasoline electrolysis to produce hydrogen, oxygen and a sludge by-product. The sludge produced by electrolysis has generally been considered a hindrance to efficiency in electrolysis because it collects in the electrolyte solution, in this case water, or on the electrodes of a typical electrolysis cell and inhibits hydrolysis. A 24 volt alternator 12 charges the batteries. 24 volts in the alternator is important for continued hydrolysis in engine system 10. 24 volts in the alternator is optimal versus 12 (standard) or 36 volts. 36 volts generates greater than optimal heat. Only one 24 volt alternator is needed, and the other alternator is a stock alternator which is 12 volt.

Air dryer 14 removes water from the hydrogen and air stream before it enters injectors. The air dryer is a novel feature of engine system 10, with respect to standard hydrolysis systems in engines. The volume of hydrogen and air that engine system 10 generates would cause stalling without the air dryer 14 to remove moisture content. The air dryer 14, a standard device in vehicles normally used for drying air from an air compressor, has been configured to be put in before the injectors. The use of a 24 volt alternator(s) 12 creates higher moisture content in the gas stream, necessitating the use of air dryer 14 before the gas stream enters the injectors.

One embodiment of the present disclosure utilizes two alternators. The first alternator is for standard operations in the automobile. The second alternator sends power hydrogen generator 100. In one embodiment, the air conditioning pump is replaced and a stock alternator is used to charge the 12 volt car battery. In this embodiment the second alternator has a voltage regulator that can be turned by hand to charge two 12 volt batteries. The 12 volt batteries were wired in series to 24 volts to power hydrogen generator 100. This configuration allowed sufficient production of fuel to power an automobile.

Figure 2:
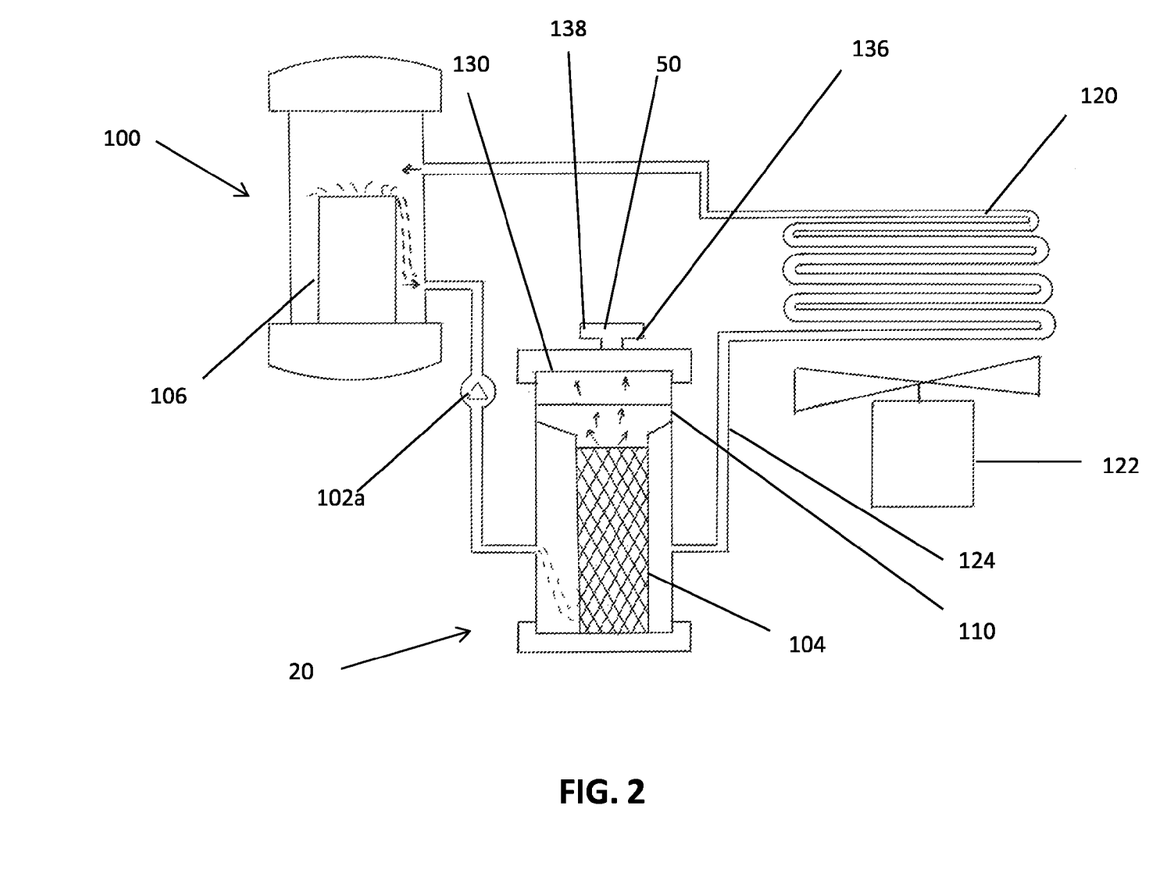
FIG. 2 is a cross-sectional side view of the system showing cooling components.

FIG. 2 is a side view schematic diagram illustrating the flow of water through system 10. Hydrolysis takes place in hydrogen generator 100. Contained within hydrogen generator 100 is Joe cell 106, where the hydrolysis reaction occurs. Cooling water pump 102 pumps water from hydrogen generator 100 to hydrogen agitator mixer 20. As water flows through hydrogen agitator mixer 20 it passes through filter 104. The filter 104 traps sludge produced during electrolysis in hydrogen generator 100. The filter 104 may be a standard water filter used in a home setting and may be about 12" long and 2" wide and made from foam plastic mesh and rubber.

Filter 104 may also have a ½ inch hole down the middle of the filter for forcing air or other gases into the filter 104. The particular diameter of the filter 104 hole may vary. Filtered water passes from the hydrogen agitator mixer 20 into the water output 124. From water output 124, water travels through water cooler 120, where it is cooled by fan 122. After passing through water cooler 120, the water is reintroduced to hydrogen generator 100, where it is used for hydrolysis. Related systems use additives to promote combustion of hydrogen; however, the present disclosure utilizes the sludge produced as a by-product of hydrolysis to promote combustion.

Figure 3:
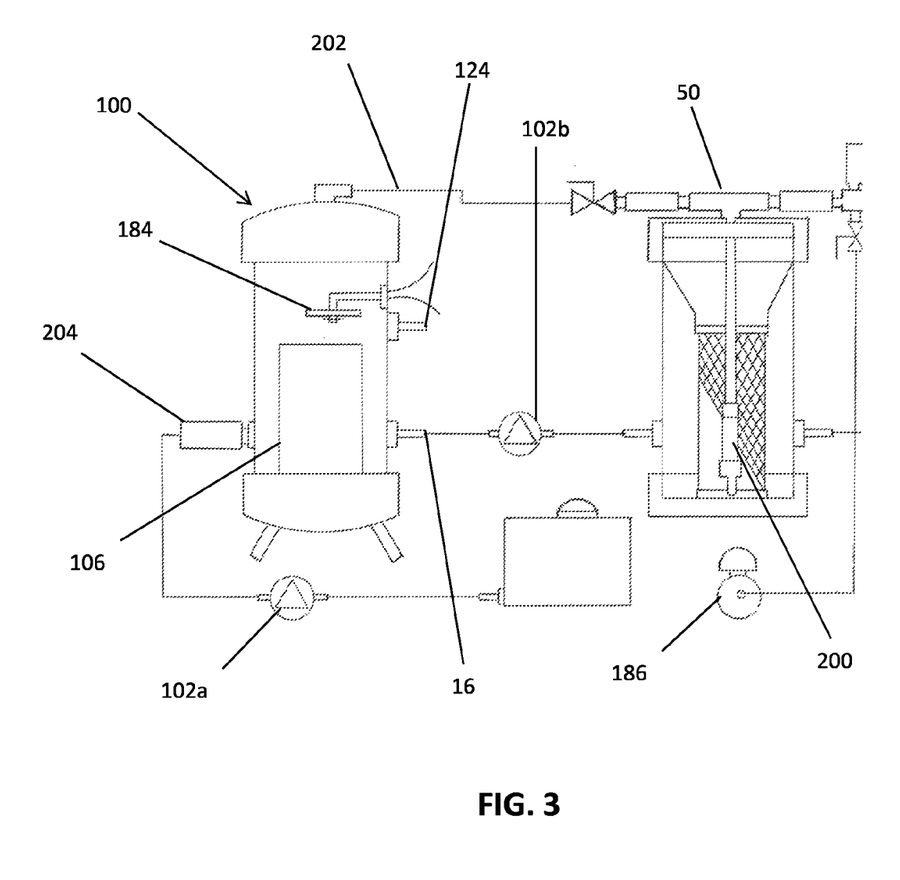
FIG. 3 is a cross sectional side view of the system showing hydrogen delivery tube adjacent the filter.
Figure 5:
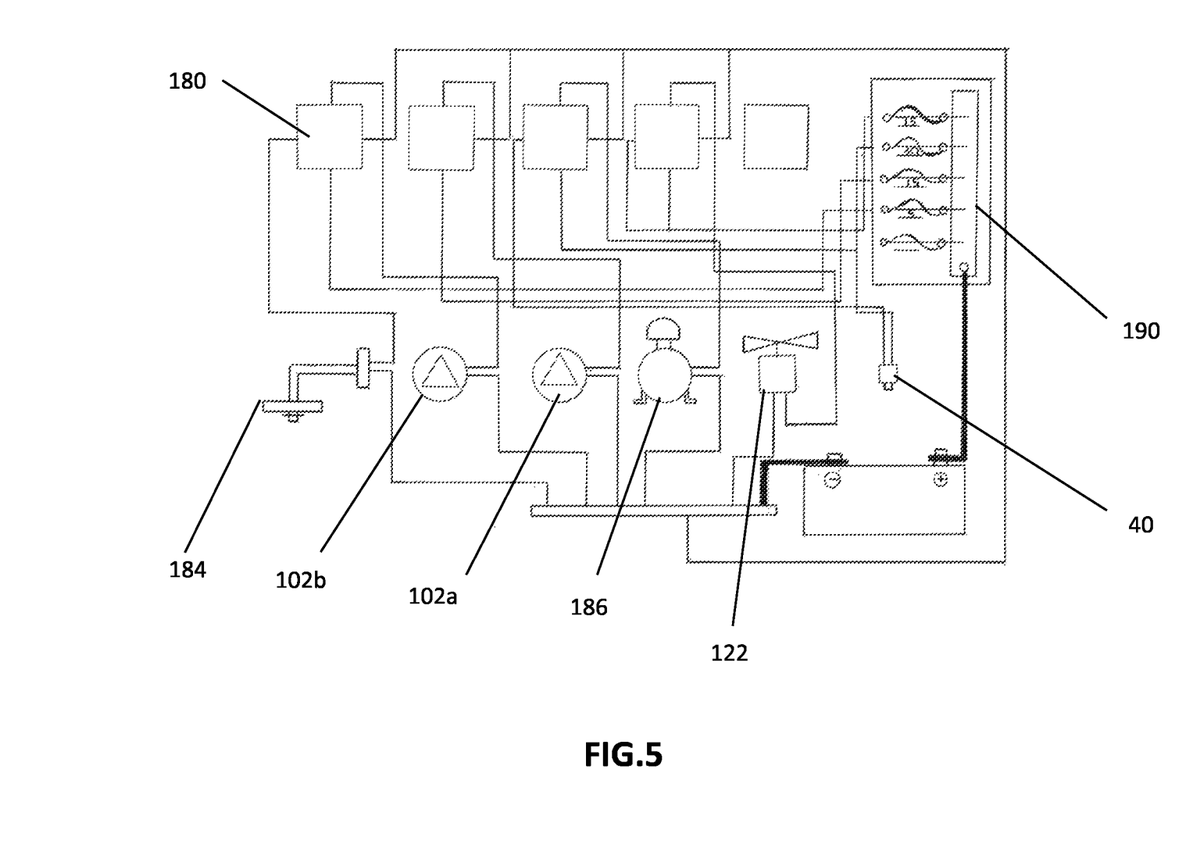
FIG. 5 is a schematic diagram of the wiring of the system of the present disclosure.

The high voltage utilized by engine system 10 created the desire for a novel method of cooling engine system 10 that improves efficiency and reduce maintenance, as shown in FIG. 2. Engine system 10 utilizes, in one embodiment, 70 amps of power for electrolysis. This level of power causes the water to boil, which could decrease efficiency of engine system 10 if not appropriately cooled. In the present disclosure, cooling water pump(s) 102*a* and 102*b*, as shown in FIG. 2, FIG. 3, and FIG. 5 are uniquely configured to cool the engine system 10. When the water leaves hydrogen generator 100 it goes to the filter 104, thereby removing residue that is formed during electrolysis then passes through water cooler 120. The cooling system of the present disclosure generally maintains temperature of the water at 120 degrees. This temperature allows for high efficiency within engine system 120.

The cooling system to move the hot water from the hydrogen generator to the hydrogen agitator mixer to the transmission cooler can be cooled with a cooling fan or from the front of the engine.

The sludge collected on filter 104 is removed from filter 104 in the hydrogen agitator generator 20 shown in FIG. 2. Hydrogen agitator mixer 20 includes a hydrogen inlet 138 and air intake 136 on opposite sides of T fitting 50. The hydrogen inlet 138 is in fluid communication with hydrogen generator 100. The air intake is connected to an air pump 186 which forces air and hydrogen down into hydrogen agitator mixer 20.

The hydrogen generator 100, as illustrated in FIG. 3, is where electrolysis occurs; whereby water is converted to hydrogen and oxygen. The housing is preferably CPVC pipe because it can be threaded to provide internal access for maintenance. A coil is not necessary in one embodiment of the present disclosure. The liquid level switch 184 controls the amount of water that comes into hydrogen generator 100 for electrolysis. The liquid level switch 184, as illustrated in FIG. 3, is an important component of the present disclosure and works in conjunction with water fill 204. The hydrogen generator 100 and the hydrogen agitator mixer 20 are preferably made of 4" pvc pipe and 4" end caps. The lines that carry the hydrogen to the injectors are made of copper to withstand the pressure and heat. The cooling lines are made from ⅜" transparent branded line, however, they could also be made from copper line. Compression fitting can control the leaks. Shut off valves are preferably used to turn gas and hydrogen on and off, but solenoids can be used as well.

In order for the system of the present disclosure to work optimally, a liquid level switch 184 that will not burn out is important. Therefore, a standard liquid level switch was not optimal. A separate volt source was utilized to send to the switch. Here, in one embodiment, a 12 volt step down converter to 5 volts triggers a relay turning the 6 amp water pump on and off.

FIG. 3 is a cross-sectional schematic diagram showing the channels and components of engine system 10 through which flow of air and water and internal components of hydrogen agitator mixer 20 and hydrogen generator 100. T fitting 50 is in fluid communication with the water pulled into the hydrogen agitator mixer 20 from the hydrogen generator 100 by water pump 102*b*. Once air and hydrogen are forced down into the water below filter 104 hydrogen delivery tube 200 by air pump 186, at 40 psi in the preferred embodiment although different pressures in a range close to 40 psi may also be effective, they form bubbles that remove sludge from filter 104. Hydrogen generator water outlet 124 and hydrogen generator water inlet 16 are used for cooling hydrogen generator 100. A certain amount of hydrogen gets trapped in with the water. The water that has hydrogen dissolved in it is released by the agitation of the mixer. Agitation occurs by gases being forced together from different lines. Engine system 10 has no shaking or mechanical mixing devices. The mixed gas in the hydrogen agitator mixer 20 goes to the injector. Air pump 186 pulls the gaseous sludge, combined with hydrogen and air, through engine system 10 contemporaneously.

In one embodiment, hydrogen generator water outlet 124 and hydrogen generator water inlet 126 are ⅜ brass male fitting. Hydrogen generator 100 has a pressure relief valve of 85 psi. Hydrogen generator 100 has a one way valve to prevent water from backing up out of the generator. The drain cock allows for drainage from hydrogen generator 100. Around hydrogen generator 100, high temperature silicon is used for fittings to prevent leakage. In one embodiment, to improve upon hydrogen yield, a battery configuration was utilized such that at least 70 amps are produced for electrolysis.

Joe cell 106 is installed and, instead of two tubes, three tubes increase effective electrolysis. Joe cell 106 may be wired with 10 gauge wire and incorporates three negative tubes and two positive tubes. Stainless steel screws to attach the wire to the stainless steel may be used in place of soldering. After connecting the tubes, three negative wires were attached together using a 10 gauge battery connector and the other two wires together also using a 10 gauge battery connector.

A ⅜ stainless steel screw was used after drilling two ⅜ holes through the CPVC end cap and both holes were tapped. The screws were applied through the end cap and a stainless steel nut was also utilized. The bottom end cap was filled with epoxy glue. The system of the present disclosure functions well with 24 volts.

The sludge, hydrogen and air in hydrogen agitator mixer 20 then rise to the surface of the aqueous solution in the hydrogen agitator mixer 20 whereupon they enter the gas head space which is in fluid communication with the line to the injectors, adjacent to rubber piece 130. Hydrogen gas is combustible and can run the engine, however, interestingly; the engine can run on the vaporized sludge produced from filter 104 alone, after the sludge has been released from filter 104 by operation of hydrogen agitator mixer 20; even when engine system 10 is operated without hydrolysis. Further, the vaporized sludge increases the fuel efficiency when combined with existing fuels.

Figure 4:
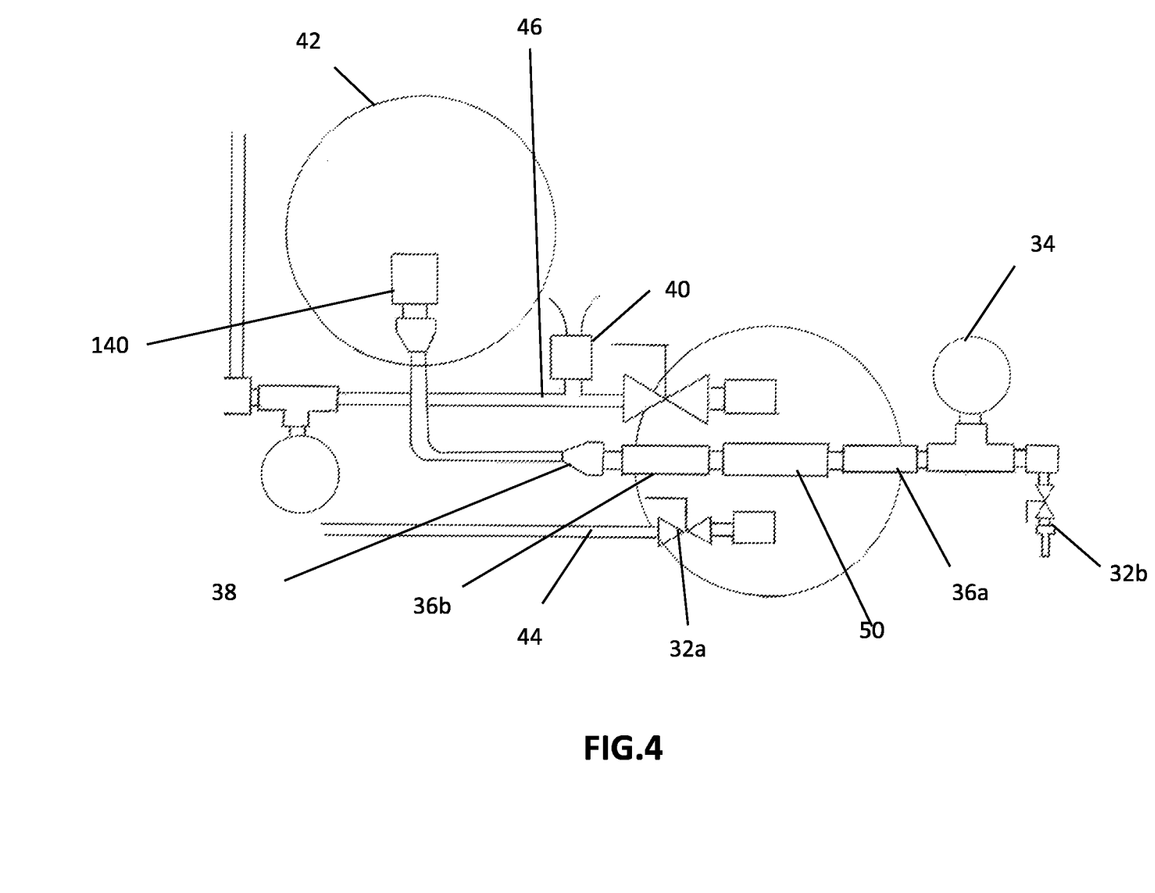
FIG. 4 is a top view of the hydrogen agitator mixer.

FIG. 4 shows a top view of hydrogen agitator mixer 20. Hydrogen outlet 140 is illustrated. Low pressure switch 40 is shown. Low pressure switch 40 is normally closed and will come on and when you reach the desired pressure it will shut the air pump off; dependent upon the fuel pressure of the vehicle. Compression fitting 38 is shown. One way valves 36*a* and 36*b* are shown. T fitting 50, where hydrogen and air enter hydrogen agitator mixer 20. Shut off valves 32*a* and 32*b* are shown. Pressure gauge 34 is shown. In engine system 10 hydrogen generator is in the back of the vehicle.

FIG. 5 shows a schematic diagram of the wiring of engine system 10. Relay(s) 180 are shown, along with liquid level switch 184 and cooling water pump(s) 102*a* and 102*b*. Also shown is air pump 186 and fan 122. Low pressure switch 40 is illustrated along with fuse panel 190.

Many standard automobile engines currently utilize a 12 volt system; however, in these systems the alternator is not capable of producing enough power to generate hydrogen and oxygen at a sufficient rate. To improve power production in the present disclosure, the voltage regulator was removed.

In one embodiment of the present disclosure, to solve the problem of existing 12 volt systems that will not charge a 24 volt system, a new conversion system was herein implemented. Step up convertors do exist to produce 24 volts from 12 volt systems, however, more than 24 volts is required for effective electrolysis. Therefore, a second alternator, labeled alternator 2, was incorporated to charge the 24 volt system. For the second alternator, the voltage regulator is removed under the system of the present disclosure. This voltage regulator may have a hand-operated dial. Additionally, a voltmeter that reads at least 32 volts may be installed.

The generator is mounted preferably as close to the engine as possible, however, in alternative embodiments the generator may be mounted in the rear trunk or in the back of a truck. The alternator and the voltage regulator are mounted in the inside of vehicle. The 32 gauge voltmeter and the pressure guide are also mounted within the vehicle.

The arrangement of the alternators, as illustrated in FIG. 2, is important to the present disclosure. The wiring for the stock alternator remains the same. Preferably, a battery extender is used in conjunction with the standard 12 volt battery for a car. This allows for addition of devices to the battery, such as the pumps of the present disclosure or additional fuse boxes.

The second alternator of the present disclosure may have, in one embodiment, leads labeled P and G, for power and ground. The power lead charges a 24 volt battery system and the G lead is for grounding, preferably with a 4 gauge wire. Alternatively, 2 gauge wire may be used. To achieve the effect of a 24 volt battery, two 12 volt marine batteries are wired in series, resulting in 24 volts. A key element of engine system 10 is having batteries in series that provide the 24 volts you need a way to recharge those batteries with an alternator or some sort of charger. You need 316 stainless steel with about an ¼ inch gap arranged neg-pos-neg-pos-neg so, two positives and three negatives. A 4 gauge wire can be used but 2 gage wire provides less voltage drop.

In the cell the wires, necessary to wire the joe cell, are 10 gauge wires. 4 gauge wires did not split the water molecules fast enough. The heat is created by the 2 gauge wires to the 10 gauge wire.

In one embodiment, a first battery has the negative side wire extending from the alternator and the positive wire to the ITHO Generator. The first battery operates as a 12 volt battery until it is wired into the second battery. After connection in series with the second battery, 24 volts are supplied.

In one embodiment, with regard to the voltage regulator the power lead connects to the first battery of the 24 volt system. An important element of the present disclosure is the configuration of the batteries and alternators. The present disclosure recognizes that connecting the 12 volt battery from a first alternator would result in excess power being returned to the system, potentially leading to burning out of onboard computers or other vehicle components.

In an alternative embodiment, for use with bigger engines, a 200 amp isolator may be used. Further, an additional hydrogen generator, or cell two, having level switches and separate Joe cells is incorporated. In this embodiment, four 12 volt marine batteries are utilized; two for the first cell and two for the second cell. In this embodiment of the present disclosure, both battery banks are charged using the 50 amp voltage regulator. In other embodiments, additional cells can yield greater amounts of hydrogen.

Injectors may be supplied by CNG Technology or Impco Technology, for placement under the stock injector. These injectors may be drilled into the exhaust manifold so that the gas being produced can be injected into the gas engine. In the present system, hydrogen is not stored.

In one embodiment of the present disclosure, a vaporizer regulator having an inlet and outlet may be utilized for the car antifreeze to heat the hydrogen while the engine is running. This may be accomplished by using a vacuum valve connected to the vaporizer so the hydrogen gas can be released from the vaporizer itself. From there, a connection is made to the injector rail so hydrogen gas can be injected into the exhaust manifold, thereby allowing the engine to run on hydrogen power.

In alternative embodiments of the present disclosure for use with newer vehicles, an emulator may be required. The emulator takes signals from the car's injectors and sends them to the onboard computer so the car runs smoothly. Further, the emulator ties into the oxygen sensors map sensor in a 4, 6 or 8 cylinder car.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

I claim:

1. An engine system for enhancing fuel economy in internal combustion engines, comprising:
    an internal combustion engine having fuel feed means for feeding a fuel-air mixture to at least one combustion chamber;
    an electrical generating and storage means for generating and storing electrical energy;
    an electrolytic cell for generating hydrogen, oxygen and sludge therein and having a housing, an anode and a cathode and having an electrolyte solution in said housing;

electrical connecting means connecting said electrical generator and storage means to said electrolytic cell for generating hydrogen, oxygen and the sludge;

a cooling line for circulating the electrolyte solution through the system;

a filter in the engine system through which the electrolyte solution passes to collect the sludge;

an agitator tube leading to a filter chamber, the filter chamber being separate from the electrolysis chamber, to pump hydrogen, oxygen and air into and beneath at least a portion of the filter to release the sludge to form a sludge-containing gas;

a head space for collecting the sludge-containing gas;

a head space line connecting the head space containing the sludge-containing gas to an at least one injector;

an electrolytic cell line connecting said electrolytic cell to at the least one injector for directing hydrogen, oxygen, air to said at least one injector.

2. The engine system of claim 1, wherein the electrical storage means is at least two batteries in series.

3. The engine system of claim 1, wherein the filter is a plastic and foam filter to which sludge binds.

4. The engine system of claim 3, wherein the filter is a hollow cylinder.

5. The engine system of claim 1, wherein the electrolyte solution flows through a cooling line.

6. The engine system of claim 1, wherein the agitator tube runs through the filter.

7. The engine system of claim 1, wherein the electrolytic cell is on an opposite end of a vehicle from the internal combustion engine.

8. The engine system of claim 1 wherein the electrical generating means is a 24 volt alternator.

9. The engine system of claim 1, further comprising an air dryer to dry the hydrogen, oxygen, air in the electrolytic cell line to the injector.

10. An engine system for enhancing fuel economy in internal combustion engines, comprising:

an internal combustion engine having fuel feed means for feeding a fuel-air mixture to at least one combustion chamber;

an electrical generating and storage means for generating and storing electrical energy;

an electrolytic cell for generating hydrogen, oxygen and sludge therein and having a housing, an anode and a cathode and having an electrolyte solution in said housing;

electrical connecting means connecting said electrical generator and storage means to said electrolytic cell for generating hydrogen, oxygen and the sludge;

a filter in the engine system through which the electrolyte solution passes to collect the sludge;

an agitator tube leading to a filter chamber, the filter chamber being separate from the electrolysis chamber, to pump hydrogen, oxygen and air into and beneath at least a portion of the filter to release the sludge to form a sludge-containing gas;

a head space for collecting the sludge-containing gas;

a head space line connecting the head space containing the sludge-containing gas to an at least one injector;

an electrolytic cell line connecting said electrolytic cell to at the least one injector for directing hydrogen, oxygen, air to said at least one injector.

11. An engine system for enhancing fuel economy in internal combustion engines, comprising:

an internal combustion engine having fuel feed means for feeding a fuel-air mixture to at least one combustion chamber;

an electrical generating and storage means for generating and storing electrical energy;

an electrolytic cell for generating hydrogen, oxygen and sludge therein and having a housing, an anode and a cathode and having an electrolyte solution in said housing;

electrical connecting means connecting said electrical generator and storage means to said electrolytic cell for generating hydrogen, oxygen and the sludge;

a filter in the engine system through which the electrolyte solution passes to collect the sludge;

an agitator tube leading to a filter chamber, the filter chamber being separate from the electrolysis chamber, to pump a gas into and beneath at least a portion of the filter to release the sludge to form a sludge-containing gas;

a head space for collecting the sludge-containing gas;

a head space line connecting the head space containing the sludge-containing gas to an at least one injector;

an electrolytic cell line connecting said electrolytic cell to at the least one injector for directing hydrogen, oxygen, air to said at least one injector.

12. The engine system of claim 11, wherein the electrical storage means is at least two batteries in series.

13. The engine system of claim 11, wherein the filter is a plastic and foam filter to which sludge binds.

14. The engine system of claim 13, wherein the filter is a hollow cylinder.

15. The engine system of claim 11, wherein the electrolyte solution flows through a cooling line.

16. The engine system of claim 11, wherein the agitator tube runs through the filter.

17. The engine system of claim 11, wherein the electrolytic cell is on an opposite and of a vehicle from the internal combustion engine.

18. The engine system of claim 11, wherein the electrical generating means is a 24 volt alternator.

19. The engine system of claim 11, further comprising an air dryer to dry the hydrogen, oxygen, air in the electrolytic cell line to the injector.

* * * * *